United States Patent
Kim

(10) Patent No.: US 9,254,961 B2
(45) Date of Patent: Feb. 9, 2016

(54) APPARATUS FOR COLLECTING DISPENSED DRUGS

(71) Applicant: JVM CO., LTD., Daegu (KR)

(72) Inventor: Jun Ho Kim, Daegu (KR)

(73) Assignee: JVM CO., LTD., Daegu (KR)

( * ) Notice: Subject to any disclaimer, the term of this patent is extended or adjusted under 35 U.S.C. 154(b) by 0 days.

(21) Appl. No.: 14/196,567

(22) Filed: Mar. 4, 2014

(65) Prior Publication Data

US 2014/0262689 A1    Sep. 18, 2014

(30) Foreign Application Priority Data

Mar. 14, 2013  (KR) .................. 10-2013-0027032
Mar. 14, 2013  (KR) .................. 10-2013-0027033

(51) Int. Cl.
| | | |
|---|---|---|
| *B65G 15/26* | (2006.01) | |
| *B65G 21/14* | (2006.01) | |
| *B65G 47/88* | (2006.01) | |
| *G07F 11/42* | (2006.01) | |
| *G07F 17/00* | (2006.01) | |
| *G07F 11/58* | (2006.01) | |
| *A61J 7/00* | (2006.01) | |

(52) U.S. Cl.
CPC ............... *B65G 15/26* (2013.01); *B65G 21/14* (2013.01); *B65G 47/8823* (2013.01); *G07F 11/42* (2013.01); *G07F 11/58* (2013.01); *G07F 17/0092* (2013.01); *A61J 7/0084* (2013.01); *B65G 2205/04* (2013.01)

(58) Field of Classification Search
CPC .... B65G 15/26; B65G 21/14; B65G 47/8815; B65G 47/8823; B65G 2201/027; B65G 2205/04; G07F 11/58; G07F 17/0092; A61J 7/02; A61J 7/0084

USPC .......... 198/594, 459.6, 530, 531, 534; 221/12
See application file for complete search history.

(56) References Cited

U.S. PATENT DOCUMENTS

| | | | | |
|---|---|---|---|---|
| 4,062,438 A | * | 12/1977 | Cottrell ................... | G06M 3/02 198/419.3 |
| 4,298,118 A | * | 11/1981 | Cottrell .................. | B65G 47/14 198/382 |
| 6,189,679 B1 | * | 2/2001 | Grinder .............. | B65G 47/1471 198/419.1 |
| 6,209,708 B1 | * | 4/2001 | Philipp ................... | B65B 43/42 141/166 |
| 7,596,925 B2 | * | 10/2009 | Yuyama ................... | B41J 2/325 156/384 |
| 7,806,678 B2 | * | 10/2010 | Finkowski ............... | A21C 9/00 198/459.6 |
| 8,181,768 B2 | * | 5/2012 | Kalm ..................... | B43M 3/045 198/409 |

(Continued)

FOREIGN PATENT DOCUMENTS

| | | |
|---|---|---|
| DE | 1 221 973 | 7/1966 |
| EP | 1 666 383 A1 | 6/2006 |

(Continued)

*Primary Examiner* — Leslie A Nicholson, III
*Assistant Examiner* — Keith R Campbell
(74) *Attorney, Agent, or Firm* — Birch, Stewart, Kolasch & Birch, LLP

(57) ABSTRACT

An apparatus for collecting drugs dispensed from drug dispensing boxes includes a main conveyor on which the dispensed drugs are placed and discharged to a first end thereof, and an auxiliary conveyor configured to be hidden at a lower portion of the first end of the main conveyor or to be expanded outside of the first end so as to increase a discharging path of the dispensed drugs. Due to the auxiliary conveyor, when the drugs are discharged or are redelivered to another apparatus, it is possible to control the drugs to fall down to a desired position.

19 Claims, 16 Drawing Sheets

(56) References Cited

U.S. PATENT DOCUMENTS

| | | | | |
|---|---|---|---|---|
| 8,186,502 B2* | 5/2012 | Mackin | ................ | B65G 15/26 198/313 |
| 2005/0224511 A1 | 10/2005 | Kim | | |
| 2007/0284220 A1* | 12/2007 | Riddick | ................ | B65G 17/24 198/457.05 |
| 2010/0239399 A1* | 9/2010 | Hoogestraat | ........ | B65G 65/466 414/310 |
| 2011/0108396 A1* | 5/2011 | Costanzo | ............... | B65G 17/24 198/836.1 |
| 2011/0168733 A1 | 7/2011 | Yuyama et al. | | |
| 2011/0315507 A1* | 12/2011 | Yang | ................ | B65G 47/8823 193/35 TE |
| 2012/0239186 A1* | 9/2012 | Kim | ..................... | G07F 11/005 700/232 |

FOREIGN PATENT DOCUMENTS

| | | |
|---|---|---|
| JP | 07-309434 A | 11/1995 |
| NL | 9100910 A | 12/1992 |
| WO | WO 2006/068443 A1 | 6/2006 |

* cited by examiner

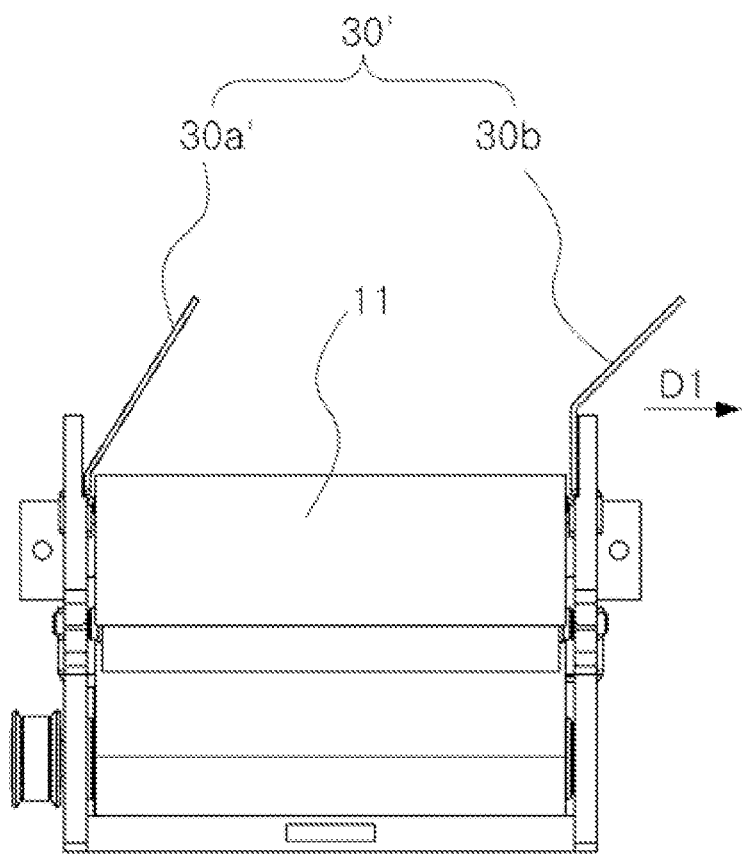

APPARATUS FOR COLLECTING DISPENSED DRUGS

CROSS-REFERENCE TO RELATED APPLICATION

This application claims priority to and the benefit of Korean Patent Application Nos. 10-2013-0027032 and 10-2013-0027033, filed on Mar. 14, 2013, the disclosure of which is incorporated herein by reference in its entirety.

BACKGROUND

1. Field of the Invention

The present invention relates to an apparatus for collecting dispensed drugs and, more particularly, to an apparatus for collecting drugs dispensed from drug dispensing boxes as a part of drug dispenser for automatically dispensing the drugs rather than manually dispensing the drugs.

2. Discussion of Related Art

In general, a dosage of medication based on a prescription for a patient may include various kinds and shapes of drugs. Such dosage of medication is contained in a basket, and is delivered to a patient.

The various drugs contained in one basket are collected into the basket from boxes in which the respective drugs are stored according to a kind and number of the drugs written in the patient's prescription. The basket into which the drugs are collected is delivered to the patient, and the patient takes the drugs collected into the basket.

To collect the various drugs into one basket, a medical expert such as a pharmacist needs to manually select and store the drugs according to a patient's prescription. Thus, reconfirmation of determining the accuracy of drug collection is necessary. This makes it difficult to guarantee the accuracy of drug collection, and always includes a possibility of a pharmaceutical accident. In addition to the possibility of the pharmaceutical accident, the drug collection itself is complicated, and thus it takes a long time to collect the drugs consistently with the patient's prescription. This leads to a problem of reduced work efficiency. For this reason, studies of plans and techniques for improving accuracy and efficiency in collecting a dosage of medication according to a patient's prescription, providing convenience to a user such as a pharmacist and preventing pharmaceutical accidents in advance are required.

SUMMARY OF THE INVENTION

The present invention is directed to means for expanding a discharging path allowing dispensed drugs to be discharged to a desired position when the dispensed drugs are discharged or are redelivered to another apparatus.

The present invention is directed to means for detecting an operation of the discharging path expanding means so as to enable precise control of the discharging path expanding means.

The present invention is directed to a drug containing apparatus having means capable of temporarily delaying discharge of collected drugs in the process of collecting a dosage of medication.

The present invention is directed to means for detecting an operation of the discharge delaying means so as to enable precise control of the discharge delay.

According to an aspect of the present invention, there is provided an apparatus for collecting drugs dispensed from drug dispensing boxes. The apparatus includes: a main conveyor on which the dispensed drugs are placed and discharged to a first end thereof; and an auxiliary conveyor configured to be hidden at a lower portion of the first end of the main conveyor or to be expanded outside of the first end so as to increase a discharging path of the dispensed drugs.

The auxiliary conveyor may include an auxiliary conveyor belt rotated along an endless track, and a pair of auxiliary track shafts provided at both ends of the auxiliary conveyor belt to rotate the auxiliary conveyor belt.

The apparatus may further include: an extension member extending from the auxiliary conveyor to a lower portion of the main conveyor; and a rail guiding the extension member when the auxiliary conveyor is hidden and expanded.

The apparatus may further include: a rack gear extending from the auxiliary conveyor to a lower portion of the main conveyor; and a pinion gear that is provided to correspond to the rack gear and transmits a driving force such that the auxiliary conveyor is hidden or expanded.

The apparatus may further include lateral guards that are formed upward from both sides of the auxiliary conveyor and prevent the dispensed drugs from escaping when the dispensed drugs fall down to the auxiliary conveyor.

The apparatus may further include a first detector detecting whether the auxiliary conveyor is hidden or expanded.

The apparatus may further include a first detection target having at least one first protrusion protruding from the extension member extending from the auxiliary conveyor to the lower portion of the main conveyor. The first detector may include at least one first sensor detecting the at least one first protrusion when the auxiliary conveyor is hidden or expanded.

The first detector may include a first first sensor and a second first sensor, and the first detection target may include a first first protrusion detected by one of the first first sensor and the second first sensor when the auxiliary conveyor is hidden, and a second first protrusion detected by the other of the first first sensor and the second first sensor when the auxiliary conveyor is expanded.

The apparatus may further include a discharge delaying part having a gate that is opened to discharge the dispensed drugs through the first end of the main conveyor or that is closed to delay discharge of the dispensed drugs.

The discharge delaying part may include supports extending upward from both sides of the main conveyor, and at least one first hinge provided for upper ends of the supports, and the gate may extend from the first hinge toward the main conveyor, be rotated around the first hinges, and be opened to discharge the dispensed drugs through the first end of the main conveyor or be closed to delay discharge of the dispensed drugs.

The gate may be opened from the first end of the main conveyor toward an outside of the first end of the main conveyor.

The first hinge may be provided for at least one of both sides of the gate.

The main conveyor may include a main conveyor belt rotated along an endless track, and a pair of track shafts that are provided for both ends of the main conveyor belt and rotate the main conveyor belt.

The discharge delaying part may include at least a second hinge that is provided to be close and parallel to one of the track shafts, and the gate may extend upward from the second hinge, be rotated around the second hinge, and be opened to discharge the dispensed drugs through the first end of the main conveyor or be closed to delay discharge of the dispensed drugs.

The second hinge may be provided on an outer circumference of the track shaft so as to be rotated independently of the track shaft.

The apparatus may further include a second detector detecting whether the gate is opened or closed.

The apparatus may further include a second detection target that includes at least one second edge having a greater radius from the rotation center thereof than another portion. The second detector may include at least one second sensor that is provided to be spaced apart from the rotation center of the second detection target by a predetermined distance and that detects the second edge when the second detection target is rotated.

The second detector may include a first second sensor and a second second sensor that are provided to be separated by a rotation angle of the gate based on the rotation center of the gate, and the second detection target may include a first second edge detected by one of the first second sensor and the second second sensor when the gate is opened, and a second second edge detected by the other of the first second sensor and the second second sensor when the gate is closed.

The gate may further include a brush at a position close to the main conveyor belt so as to minimize a frictional force against the main conveyor belt.

According to the present invention, the auxiliary conveyor is provided, and thereby it is possible to drop the dispensed drugs to a desired position when the dispensed drugs are discharged or are redelivered to another apparatus.

Further, it is accurately detected whether the auxiliary conveyor is hidden or expanded, and thus it is possible to easily control the discharge of the drugs.

Further, the discharge delaying part is provided, and thereby the discharge delaying part delays discharge of the drugs from the main conveyor while a desired dosage of drugs is dispensed so as to allow the dispensed drugs to be discharged at an intended time. Thereby, it is possible to more precisely control the discharge and collection of the drugs so as to allow the drugs to be sorted according to a patient, a prescription, and a medication.

In addition, various types of gates are applied, and thereby it is possible to delay discharge of the drugs regardless of sizes of the drugs.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 6B is a side view showing the appearance of the apparatus for collecting dispensed drugs of FIG. 6A;

DETAILED DESCRIPTION OF EXEMPLARY EMBODIMENTS

Figure 1:
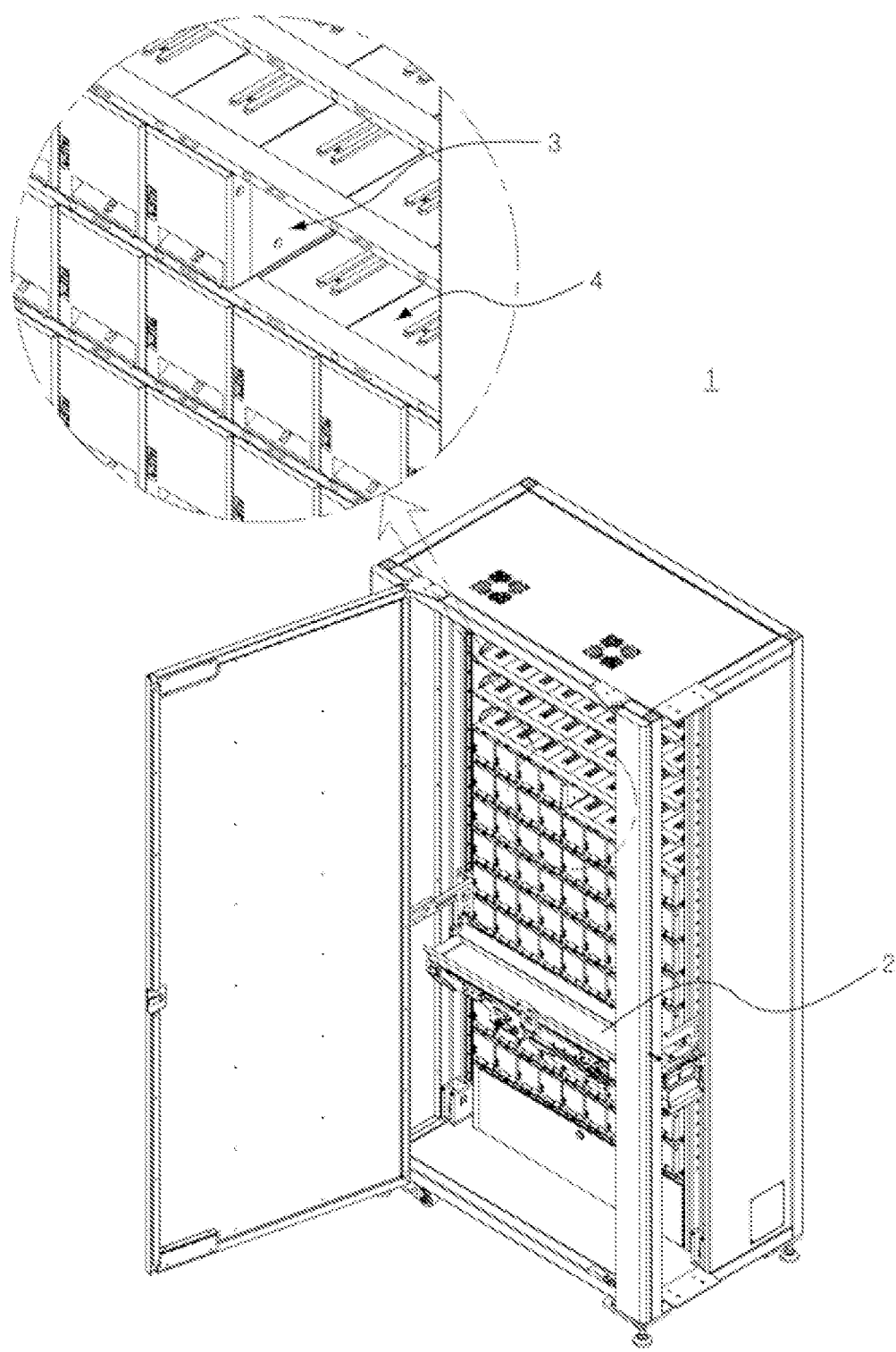
FIG. 1 is a perspective view showing an appearance of an apparatus for collecting dispensed drugs according to an embodiment of the present invention.

Exemplary embodiments of the present invention will be described in detail below with reference to the accompanying drawings. Unless otherwise defined or mentioned, all terms used herein to indicate directions are based on the directions indicated in the drawings. Further, the same reference numbers are used throughout the drawings to refer to the same or similar components. Meanwhile, the dimensions such as a thickness of each component indicated in the drawings can be exaggerated for the convenience of description. Thus, each component need not be configured with real dimensions or on a real scale.

An apparatus for collecting dispensed drugs, which includes each component according to the present invention, will be described with reference to FIG. 1. FIG. 1 is a perspective view showing an appearance of an apparatus for collecting dispensed drugs according to an embodiment of the present invention.

A drug dispenser 1 according to the present embodiment includes cartridges 4, drug dispensing boxes 60, and an apparatus 2 for collecting dispensed drugs. Among these, the present invention relates to the apparatus 2 for collecting dispensed drugs. The apparatus 2 for collecting dispensed drugs includes a main conveyor, a discharge delaying part, a lateral guard, and so on. Hereinafter, each component will be described in detail with reference to the accompanying drawings.

Figure 2:
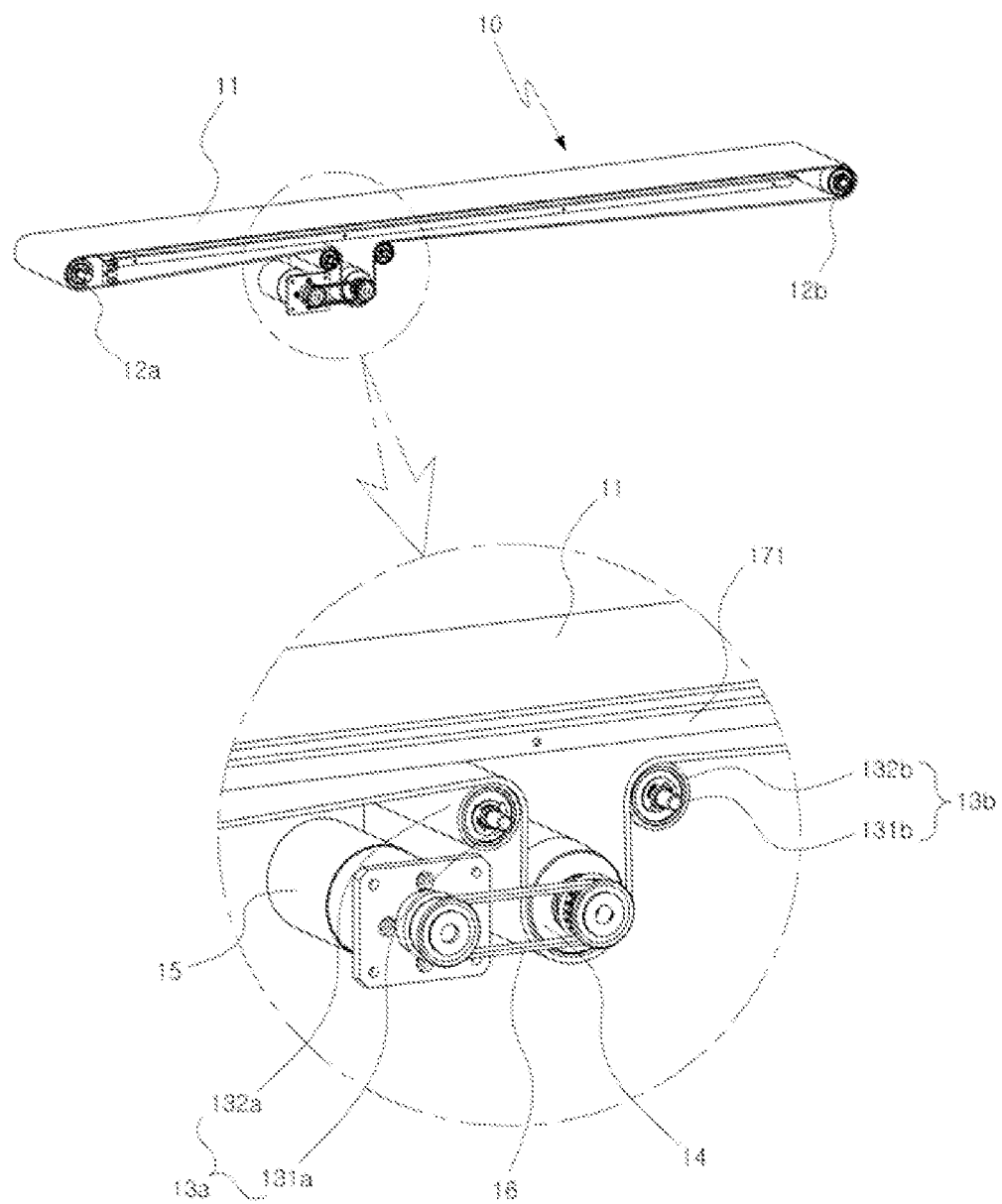
FIG. 2 is a perspective view showing a state in which a main conveyor according to an embodiment is partly cut off.
Figure 3:
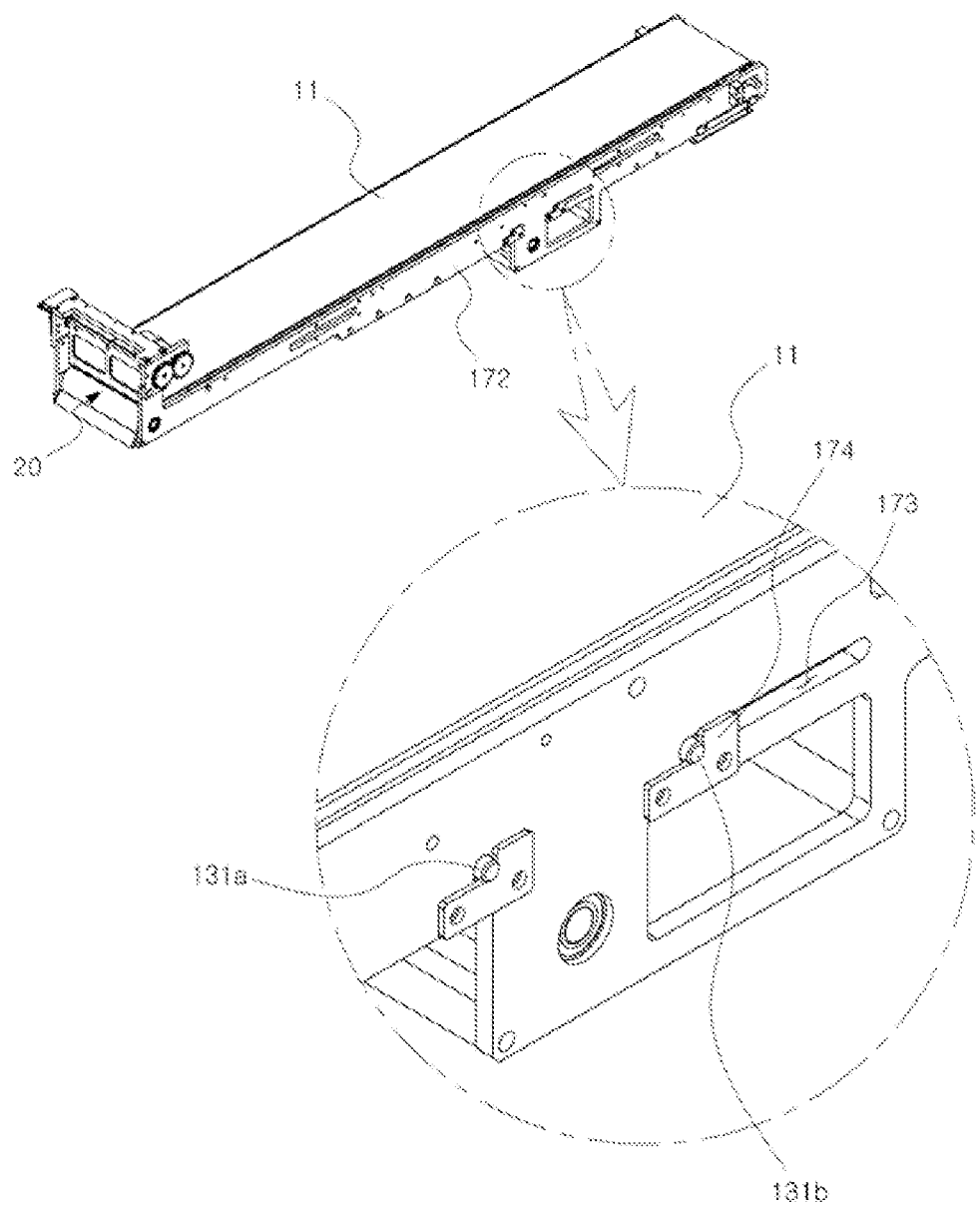
FIG. 3 is a perspective view showing an appearance of the main conveyor according to the embodiment.

A main conveyor according to an embodiment will be described with reference to FIGS. 2 and 3. FIG. 2 is a perspective view showing a state in which a main conveyor according to an embodiment is partly cut off, and FIG. 3 is a perspective view showing an appearance of the main conveyor according to the embodiment.

The main conveyor 10 is a component on which dispensed drugs are placed. The main conveyor 10 includes a main conveyor belt 11, a pair of track shafts 12a and 12b, a pair of path converting rolls 13a and 13b, and a driving roll 14.

The main conveyor belt 11 is rotated along an endless track. Dispensed drugs are placed on the main conveyor belt 11. Further, the pair of track shafts 12a and 12b are for both shafts of the endless track along which the main conveyor belt 11 is rotated. In other words, the main conveyor belt 11 is rotated along a track via outer circumferences of the pair of track shafts 12a and 12b.

Meanwhile, as shown in FIG. 2, the main conveyor belt 11 may be rotated via the pair of path converting rolls 13a and 13b and the driving roll 14. The driving roll 14 is connected to a motor 15 by a timing belt 16, and transmits a driving force such that the main conveyor belt 11 can be rotated. In this case, the pair of path converting rolls 13a and 13b are configured to be in contact with an outer circumference of the main conveyor belt 11, and the driving roll 14 is configured to be in contact with an inner circumference of the main conveyor belt 11. Further, the driving roll 14 is disposed between the pair of path converting rolls 13a and 13b, and is provided at a position lower than the pair of path converting rolls 13a and 13b, i.e. outward from the pair of path converting rolls 13a and 13b with respect to the main conveyor belt 11.

Further, as shown in FIG. 3, the apparatus for collecting dispensed drugs according to the present embodiment may include tension adjusters 173 and 174. The tension adjusters serve as a rotary shaft guide 173 and a rotary shaft fixture 174, both of which are provided for one of conveyor lateral members 172. In the present embodiment, the rotary shaft guide 173 is formed in a slot shape having a predetermined length so as to allow a rotary shaft 131b of one of the pair of path converting rolls 13a and 13b to move in a longitudinal direction. The rotary shaft fixture 174 functions to fix the rotary shaft 131b so as to allow the rotary shaft 131b to be located at a specified position of the rotary shaft guide 173. In this case, as a distance between the rotary shafts 131a and 131b of the pair of path converting rolls 13a and 13b becomes closer, tension of the main conveyor belt 11 becomes higher.

Meanwhile, as shown in FIG. 3, one end of the main conveyor belt 11 is provided with a discharge delaying part 20. The discharge delaying part 20 will be described below in detail.

Figure 4A:
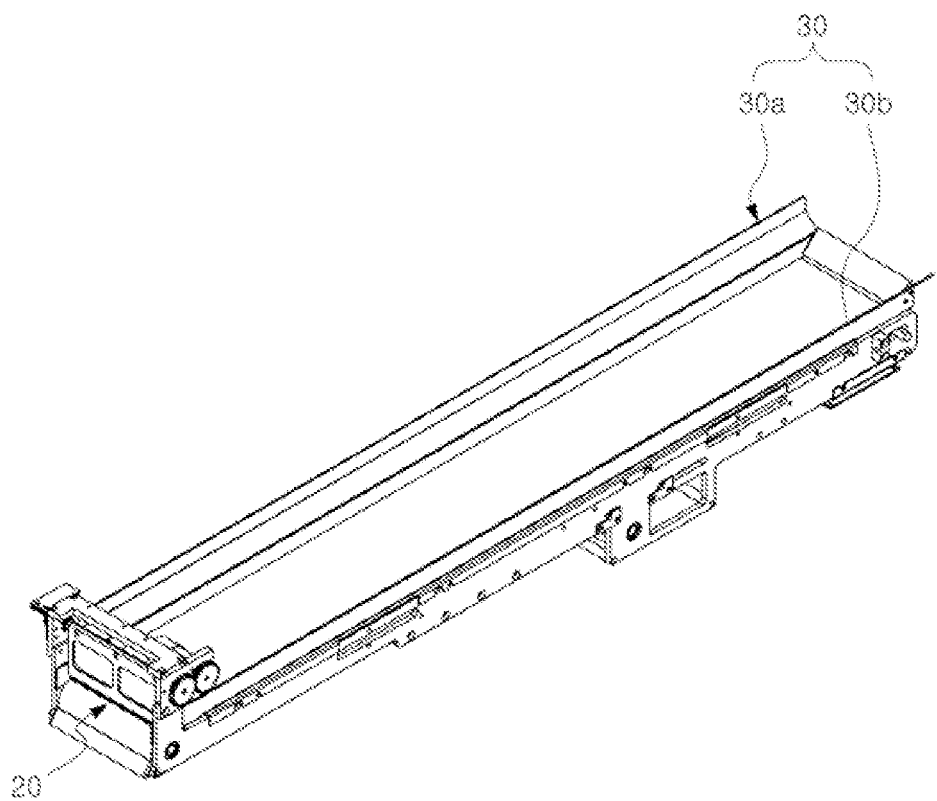
FIG. 4A is a perspective view showing an appearance of the apparatus for collecting dispensed drugs for which a lateral guard according to an embodiment is provided.

A lateral guard according to an embodiment will be described with reference to FIGS. 4A and 4B. FIG. 4A is a perspective view showing an appearance of the apparatus for collecting dispensed drugs for which a lateral guard according to an embodiment is provided, and FIG. 4B is a side view showing the appearance of the apparatus for collecting dispensed drugs of FIG. 4A.

As shown in FIG. 4A, sides of the apparatus for collecting dispensed drugs according to the present embodiment may be provided with at least one lateral guard 30 that has a predetermined height and prevents the drugs from escaping to the outside when the drugs are placed therein.

Figure 4B:
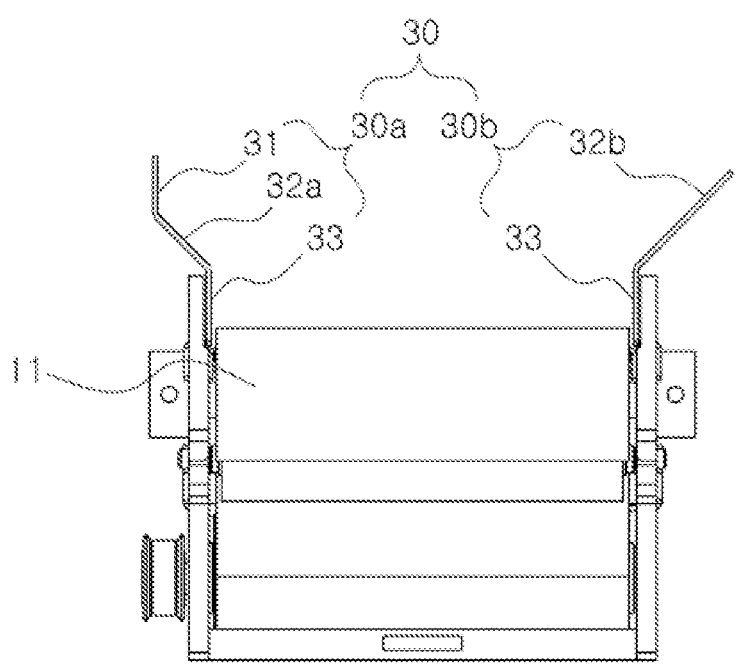
FIG. 4B is a side view showing the appearance of the apparatus for collecting dispensed drugs of FIG. 4A.

In detail, as shown in FIG. 4B, the lateral guard 30 may include fixing portions 33, first inclined portions 32a and 32b, and a height reinforcing portion 31. The fixing portions 33 are configured to fix lateral guards 30a and 30b to the lateral members 172. The first inclined portions 32a and 32b are formed to be inclined upward and outward. The first inclined portions 32a and 32b function to expand a region within which the dispensed drugs can be placed, and inclinations thereof minimize falling shock of the dispensed drugs when the drugs fall down. The height reinforcing portion 31 reinforces a height of the lateral guard 30, preventing the drug from bouncing out while the drug is being dispensed.

Figure 5A:
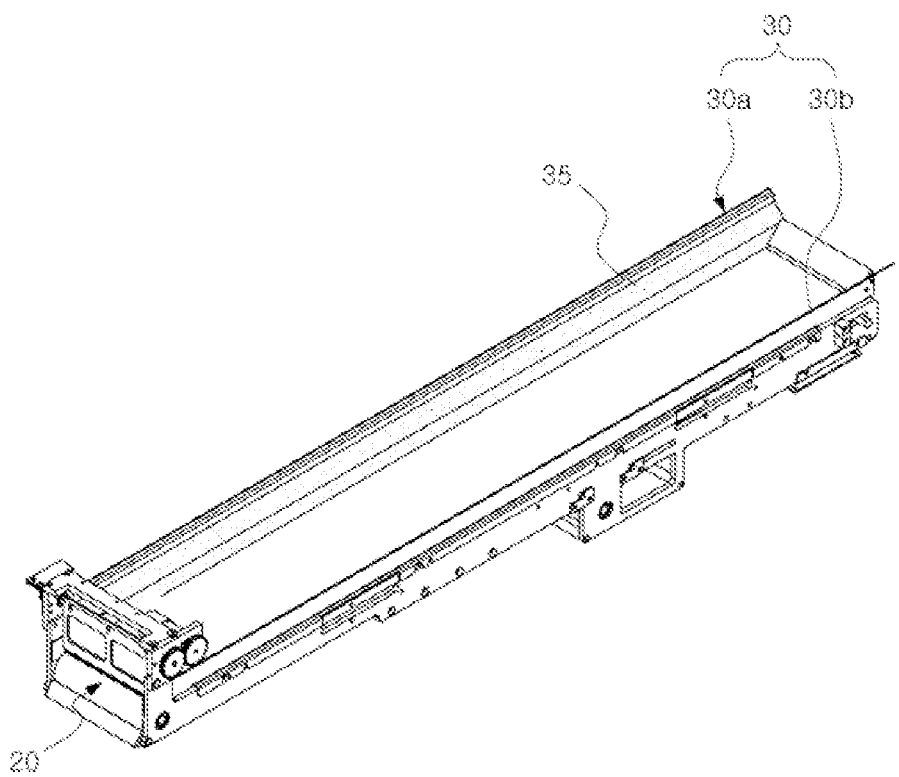
FIG. 5A is a perspective view showing an appearance of the apparatus for collecting dispensed drugs for which a lateral guard according to another embodiment is provided.

A lateral guard according to another embodiment will be described with reference to FIGS. 5A and 5B. FIG. 5A is a perspective view showing an appearance of the apparatus for collecting dispensed drugs for which a lateral guard according to another embodiment is provided, and FIG. 5B is a side view showing the appearance of the apparatus for collecting dispensed drugs of FIG. 5A.

Figure 5B:
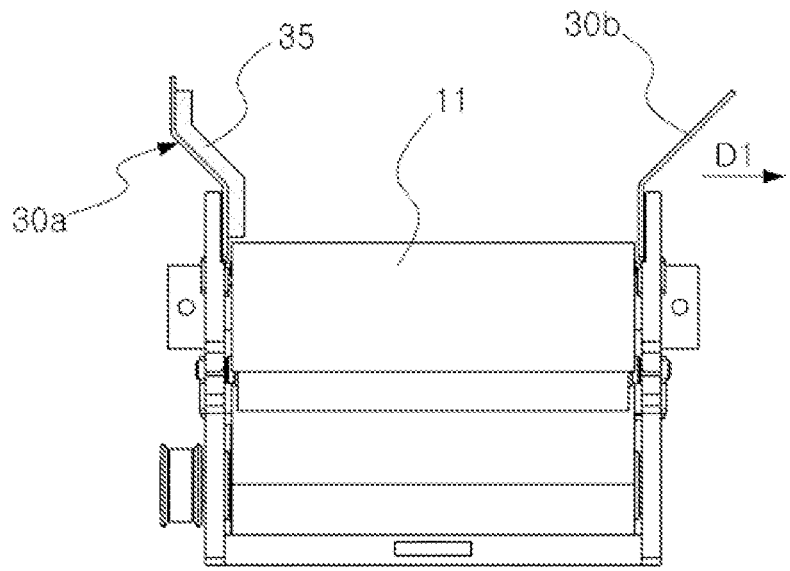
FIG. 5B is a side view showing the appearance of the apparatus for collecting dispensed drugs of FIG. 5A.

As shown in FIGS. 5A and 5B, a lateral guard 30 may be provided with a shock-absorbing member 35 that absorbs shock generated when the dispensed drug runs against an inner lateral surface thereof. As shown in FIG. 5B, the shock-absorbing member 35 is formed of a material capable of absorbing shock on inner sides of lateral guards 30a and 30b. Particularly, the shock-absorbing member 35 may be at least provided for the lateral guard 30a on the opposite side of a direction D1 in which the drug dispensing boxes are located.

Figure 6A:
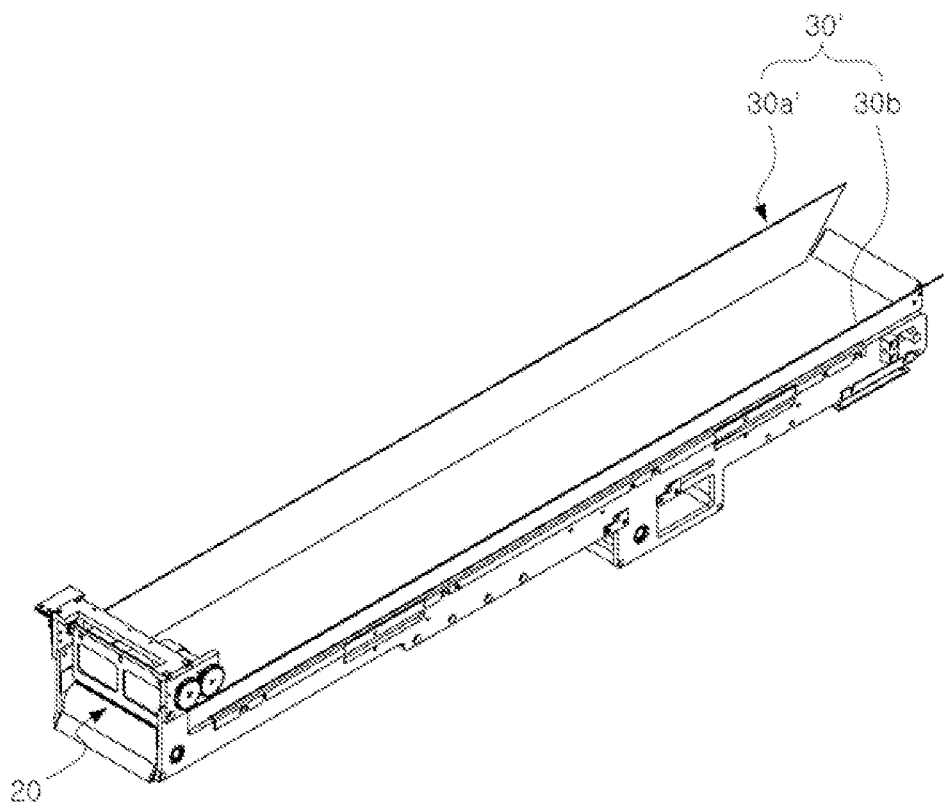
FIG. 6A is a perspective view showing an appearance of the apparatus for collecting dispensed drugs for which a lateral guard according to yet another embodiment is provided.

A lateral guard according to yet another embodiment will be described with reference to FIGS. 6A and 6B. FIG. 6A is a perspective view showing an appearance of the apparatus for collecting dispensed drugs for which a lateral guard according to yet another embodiment is provided, and FIG. 6B is a side view showing the appearance of the apparatus for collecting dispensed drugs of FIG. 6A.

In particular, as shown in FIGS. 6A and 6B, a lateral guard 30a, which is located at the opposite side of a direction D1 in which the drug dispensing boxes are located, may be provided with a second inclined portion 30a' whose inclination is formed opposite to that of the first inclined portion 32a. The second inclined portion 30a' is formed to be inclined inward. Thereby, it is possible to more actively prevent the drugs that fall down while being dispensed from bouncing out.

Figure 7:
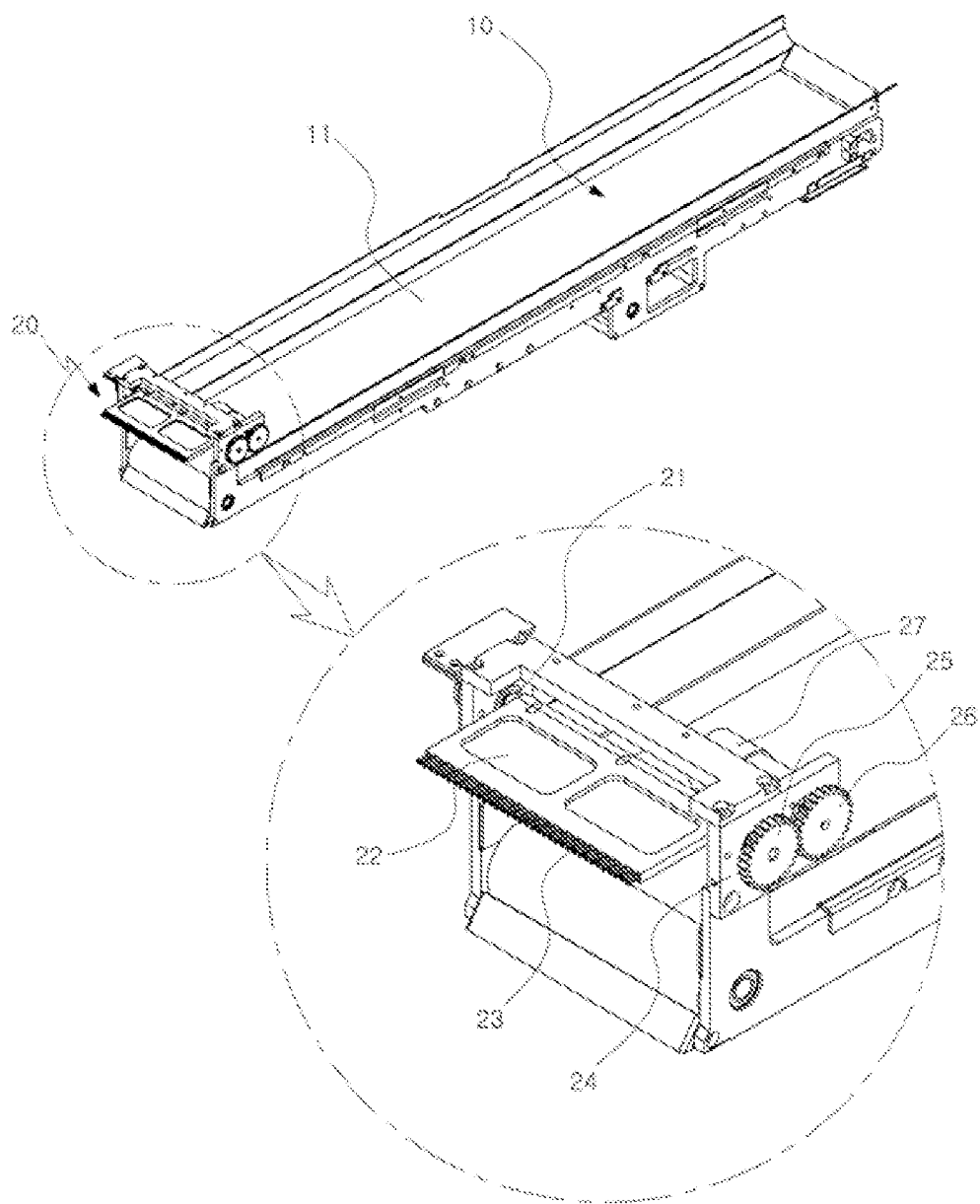
FIG. 7 is a perspective view showing an appearance of the apparatus for collecting dispensed drugs for which a discharge delaying part according to an embodiment is provided.
Figure 8A:
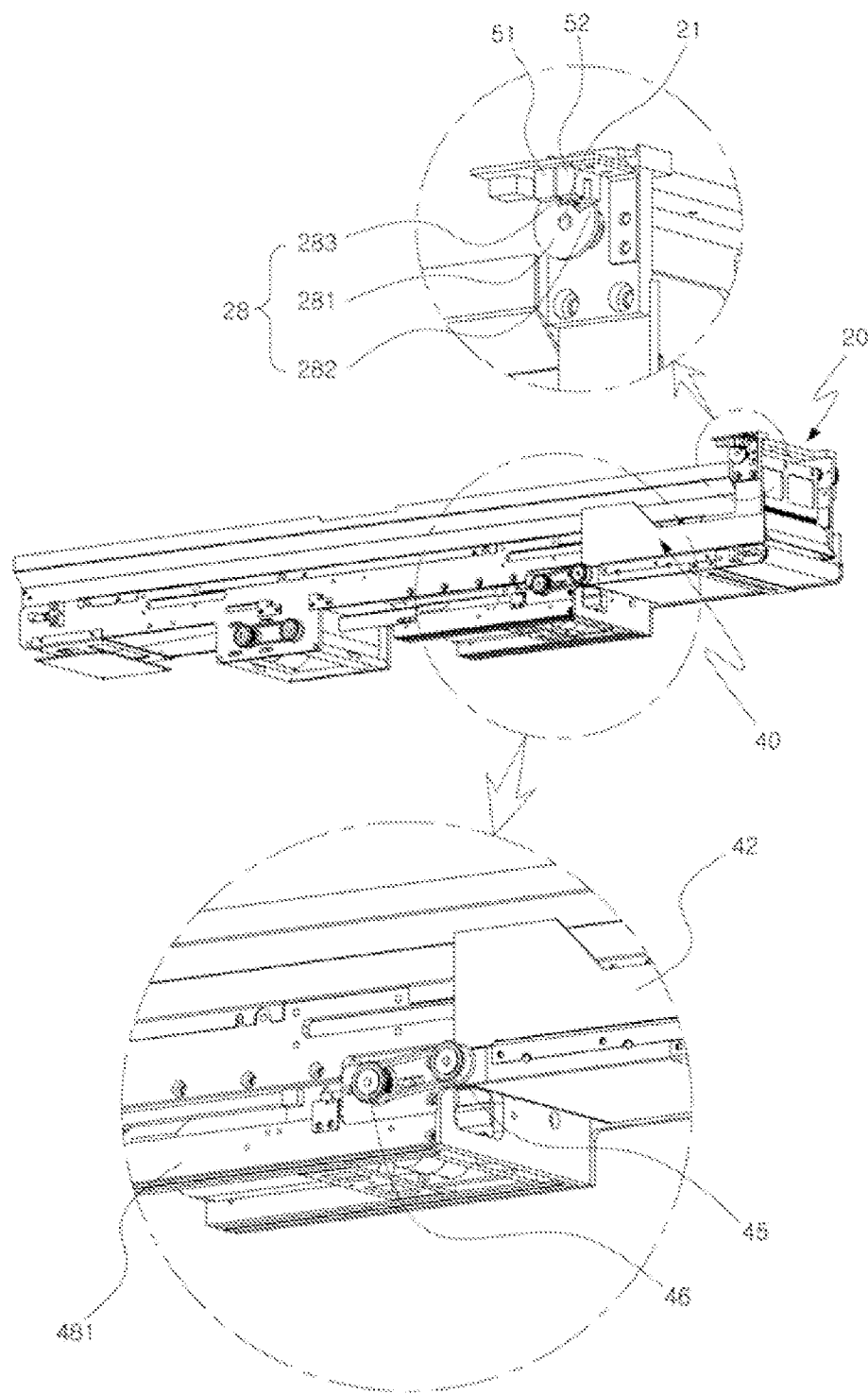
FIG. 8A is a bottom perspective view showing the appearance of the apparatus for collecting dispensed drugs for which the discharge delaying part according to the embodiment is provided.
Figure 8B:
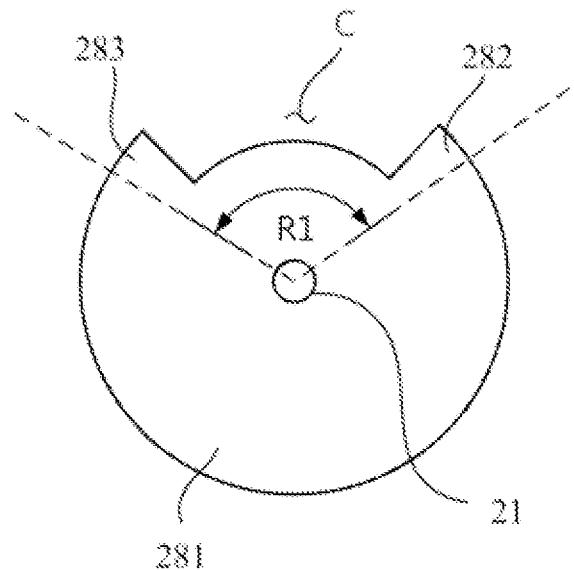
FIG. 8B is a schematic view showing an appearance of a detection target according to an embodiment.

A discharge delaying part according to an embodiment will be described with reference to FIGS. 7 to 8B. FIG. 7 is a perspective view showing an appearance of the apparatus for collecting dispensed drugs for which a discharge delaying part according to an embodiment is provided. FIG. 8A is a bottom perspective view showing the appearance of the apparatus for collecting dispensed drugs for which the discharge delaying part according to the embodiment is provided, and FIG. 8B is a schematic view showing an appearance of a detection target according to an embodiment.

One end of the main conveyor 10 is provided with a discharge delaying part 20. The discharge delaying part 20 is closed to delay discharge of the dispensed drugs moving along the main conveyor belt 11 to the outside of one end of the main conveyor belt 11 during the collection of the drugs, and is opened to discharge the collected drugs after the drugs are collected up to a preset amount.

In detail, the discharge delaying part 20 includes hinges 21, a gate 22, a brush 23, and discharge delaying part supports 24.

The supports 24 extend upward from both sides of the main conveyor 10. The gate 22 to be described below is rotatably fixed to the supports 24. The hinges 21 are rotatably fixed to both of the supports 24, and function as a central shaft of rotation of the gate 22. The gate 22 is operated in such a manner that it is rotated around the hinges and is closed in contact with the main conveyor belt 11 or that it is rotated and opened so that its end is spaced apart from the main conveyor belt 11 by a predetermined distance or more. In detail, the gate 22 is formed downward from the hinges 21 toward the main conveyor belt 11. In this case, an end of the gate 22 is provided to be close to the main conveyor belt 11. Thereby, no gap or a very narrow gap is formed between the gate 22 and the main conveyor belt 11. This state is a state in which the gate 22 is closed, and the drugs placed on the main conveyor 10 are not discharged outside.

Further, the brush 23 is provided for a lower end of the gate 22. The brush 23 prevents the drugs from escaping or jamming between the end of the gate 22 and the main conveyor belt 11 while minimizing a frictional force against the main conveyor belt 11.

One of the hinges 21 may be provided with a driven gear 25 rotated along with the hinge 21. The driven gear 25 is rotated by receiving a rotating force from a driving gear 26 rotated along with a first motor 27.

In detail, when the first motor 27 rotates in one direction, its rotating force is transmitted to the hinge 21 through the driving gear 26 and the driven gear 25. The hinge 21 is rotated in one direction by the transmitted rotating force. As a result, the gate 22 is opened or closed. As shown in FIG. 7, when the end of the gate 22 is rotated outward, a gap through which the drugs can be discharged is formed between the gate 22 and the main conveyor belt 11. This state is a state in which the gate 22 is opened.

In the case of the present embodiment, the hinges 21 are provided for both sides of the gate 22, but not limited thereto. That is, the hinge may be provided for both sides of the gate or one side of the gate.

Further, the apparatus for collecting dispensed drugs according to the present embodiment may include detectors 51 and 52 for detecting whether the discharge delaying part 20 is opened or closed. As shown in FIG. 8A, the detectors 51 and 52 according to the present embodiment serve as a first sensor 52 and a second sensor 51. Each of the sensors 51 and 52 may employ an infrared sensor. For example, each of the sensors 51 and 52 may have a light emitter and a light receiver, and detect whether another element is interposed between the light emitter and the light receiver. The detection target 28 is fixed to the other of the hinges 21 so as to be rotated along with the other hinge 21. To be specific, as shown in FIG. 8B, the detection target 28 is formed in the shape of a circular plate, a part of which serves as a cutout C. When the detection target 28 connected to the gate via the other hinge 21 is rotated, the detection target 28 is alternately rotated around the other hinge 21. In this case, a rotatable angle range of the detection target 28 is identical to that of the gate. Hereinafter, this rotatable angle range is referred to as a "rotation range R1" for the convenience of description. The cutout C is formed within a range having a smaller angle than the rotation range R1. Further, a first edge 282 and a second edge 283 refer to both sides of the cutout C, and are radially formed to have a greater radius than the cutout C. In the present embodiment, when the discharge delaying part 20 is opened, the first edge 282 is located between the light emitter and the light receiver of the first sensor 52. When the discharge delaying part 20 is closed, the second edge 283 is located between the light emitter and the light receiver of the second sensor 51. Since a portion other than the rotation range R1 is not detected by the first sensor 52 and the second sensor 51, it may be formed in any shape.

Figure 9:
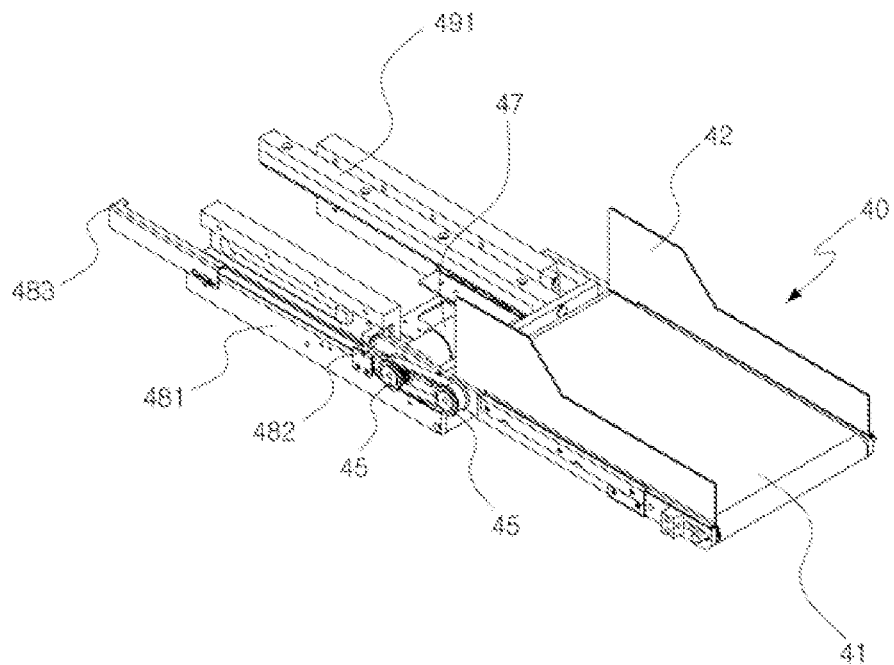
FIGS. 9 to 11 are partly cut perspective views for describing a configuration and operation of an auxiliary conveyor according to an embodiment in turn.
Figure 10:
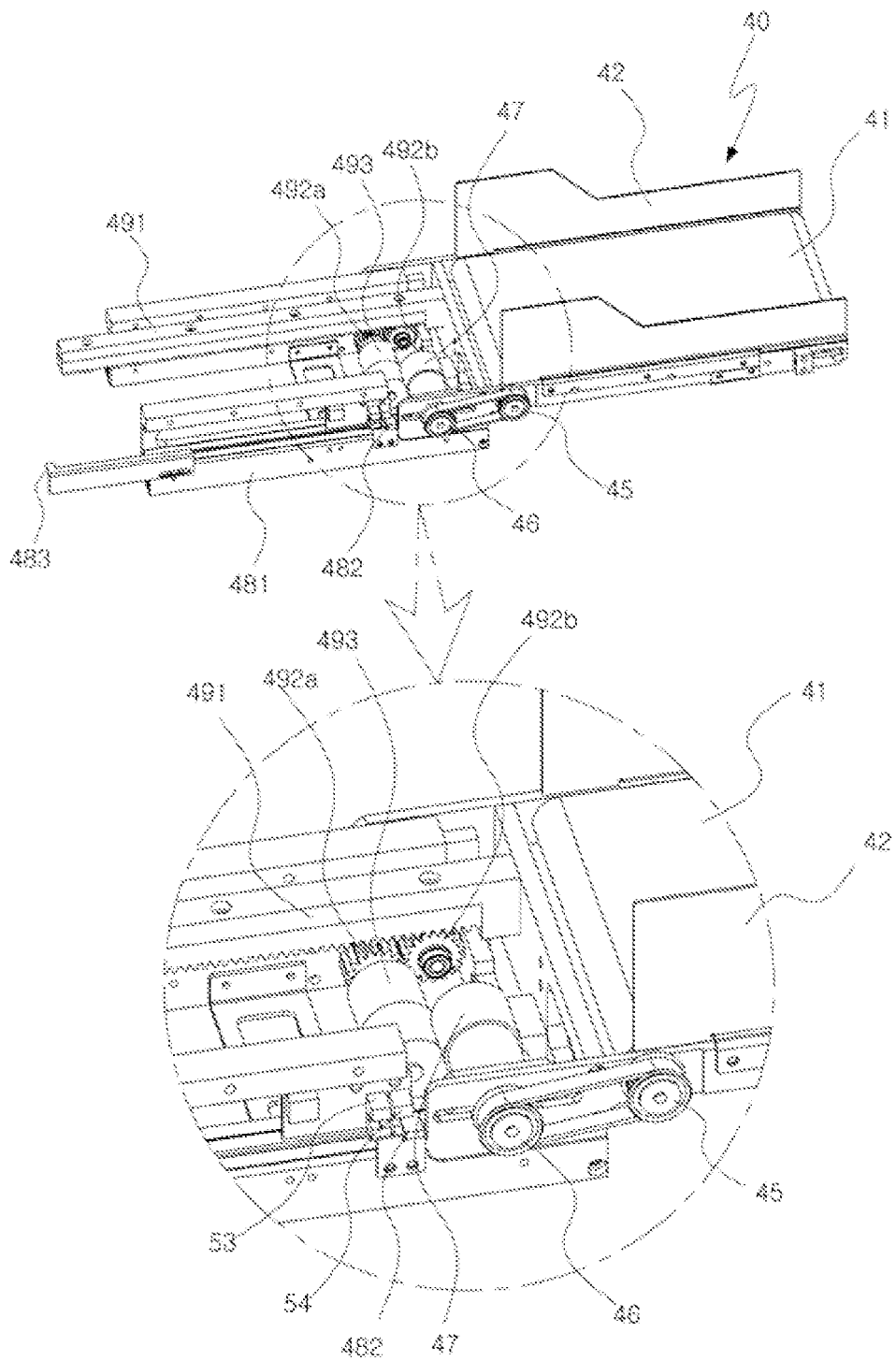
Figure 11:
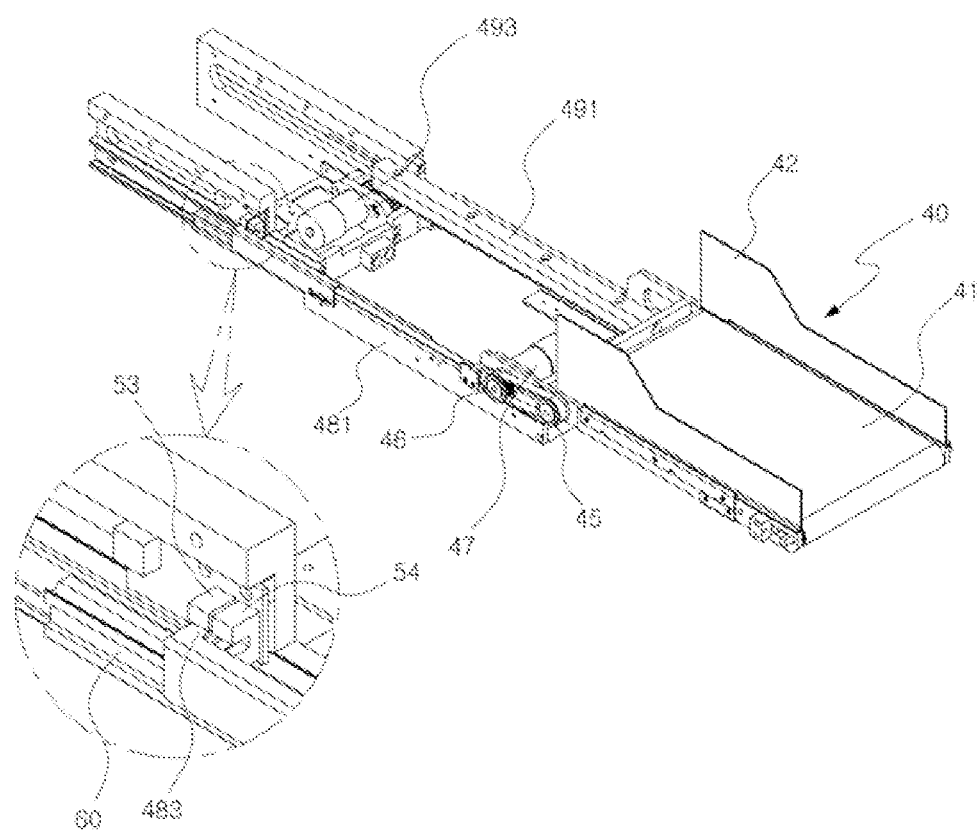

An auxiliary conveyor will be described with reference to FIGS. 8 to 11. FIGS. 9 to 11 are partly cut perspective views for describing a configuration and operation of an auxiliary conveyor according to an embodiment in turn.

A lower portion of the main conveyor is provided with an auxiliary conveyor 40 as shown in FIG. 9. The auxiliary conveyor 40 is hidden at the lower portion of the main conveyor or is expanded to further increase a dispensing path of the dispensed drugs.

The auxiliary conveyor 40 is provided with an auxiliary conveyor belt 41 rotated along an endless track. The auxiliary conveyor 40 is rotated around a pair of auxiliary track shafts like the main conveyor described above. As shown in FIG. 10, the auxiliary conveyor belt 41 may be supplied with a rotating force through transmission members 46 and 45, such as a gear or a timing belt, that are connected to a motor 47 generating the rotating force. A structure of the auxiliary conveyor 40 itself will not be described in detail.

The auxiliary conveyor belt 41 is a component for discharging the drugs carried from the main conveyor to the outside. Both sides of the auxiliary conveyor 40 are provided with auxiliary conveyor lateral guards 42 extending upward. The auxiliary conveyor lateral guards 42 cover both sides of the auxiliary conveyor 40 so as to prevent the drugs from escaping to the outside when the drugs fall down from the main conveyor or while the drugs move on the auxiliary conveyor 40 so as to be discharged.

The auxiliary conveyor 40 is provided with an extension member 481 extending to the opposite side of the collecting direction of the drugs, i.e. to the side of the main conveyor. The extension member 481 is provided with second detection targets 482 and 483. The second detection targets 482 and 483 serve as a third protrusion 482 and a fourth protrusion 483. The third protrusion 482 and the fourth protrusion 483 are components that are detected by detectors 53 and 54 to be described below to determine whether the auxiliary conveyor 40 is in a hidden or expanded state.

Further, as shown in FIG. 10, the auxiliary conveyor 40 may be provided with a rack gear 491 at the other side of the extension member 481. The rack gear 491 receives a rotating force through a pinion gear 492b engaged with a driving gear 492a rotated by a motor 493, and is thereby subjected to linear reciprocation. Due to linear reciprocation of the rack gear 491, the auxiliary conveyor 40 connected to the rack gear 491 is also subjected to linear reciprocation. In other words, as the rack gear 491 moves, the auxiliary conveyor 40 is hidden at the lower portion of the main conveyor, or moves outside the main conveyor to expand the drug discharge path as shown in FIG. 11. Here, the extension member 481 moves along a rail 60 installed along the discharge path of the main conveyor.

Further, as described above, the third protrusion 482 and the fourth protrusion 483 are detected by the detectors 53 and 54. In the present embodiment, the detectors 53 and 54 may include a fourth sensor 53 and a third sensor 54. As shown in FIG. 10, the third sensor 54 detects the third protrusion 482 in a state in which the auxiliary conveyor 40 is hidden, i.e. retreated, and located at the lower portion of the main conveyor. As shown in FIG. 11, the fourth sensor 53 detects the fourth protrusion 483 in a state in which the auxiliary conveyor 40 is expanded, i.e. moves outside, to increase the discharge path of the drugs.

Figure 12:
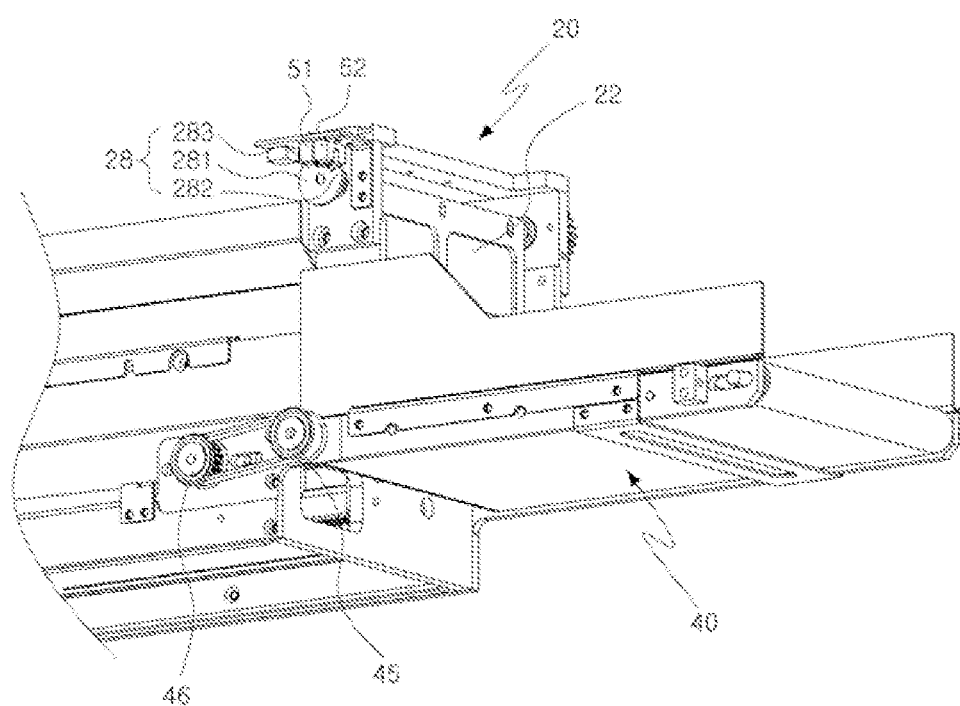
FIGS. 12 and 13 are partial bottom perspective views for describing an operation of the discharge delaying part according to the embodiment.
Figure 13:
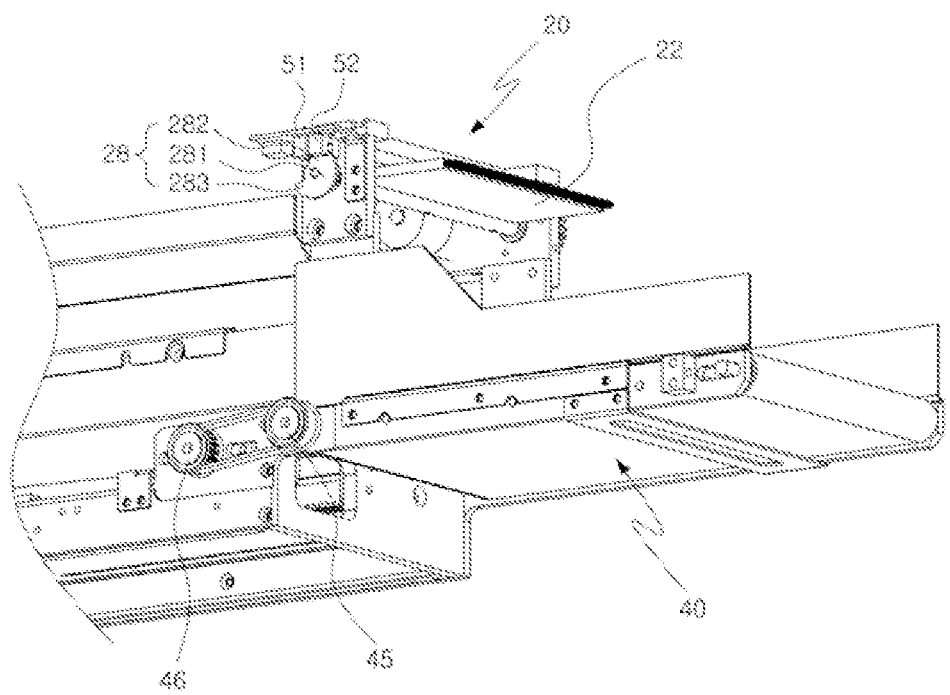

Operations of the auxiliary conveyor and the discharge delaying part will be described with reference to FIGS. 12 and 13. FIGS. 12 and 13 are partial bottom perspective views for describing an operation of the discharge delaying part according to the embodiment.

When the drugs to be discharged should be discharged at a position spaced apart from the main conveyor by a predetermined distance, the auxiliary conveyor 40 is controlled to be expanded as shown in FIG. 12. Here, the discharge delaying part 20 is controlled to be closed until an appropriate time to discharge the drugs arrives. In this case, the second edge 283 is detected by the second sensor 51, and thus the gate 22 is rotated to face downward.

Next, the auxiliary conveyor 40 is controlled to be driven by the rotating force transmitted through the transmission members 46 and 45, and the discharge delaying part 20 is controlled to be converted into an opened state. Here, the first edge 282 is detected by the first sensor 52, and the gate 22 is rotated and opened in the discharging direction of the drugs.

Meanwhile, the aforementioned case in which the drugs to be discharged should be discharged at a position spaced apart from the main conveyor by a predetermined distance may refer to the following situation. For example, this situation may correspond to a case in which a plurality of apparatuses for collecting dispensed drugs using the auxiliary conveyor 40 according to the present embodiment are provided, and the dispensed drugs should be sequentially delivered between the plurality of apparatuses for collecting dispensed drugs. Here, the auxiliary conveyors 40 may be expanded to deliver the dispensed drugs to the main conveyor of the other apparatuses for collecting dispensed drugs. As another example, the situation may correspond to a case in which the dispensed drugs should be delivered to a component of another apparatus for collecting the dispensed drugs or distributing the dispensed drugs to a truck. In this way, the auxiliary conveyors according to the present embodiment may be used to deliver the dispensed drugs to a specified position of a homogeneous or heterogeneous apparatus.

Figure 14:
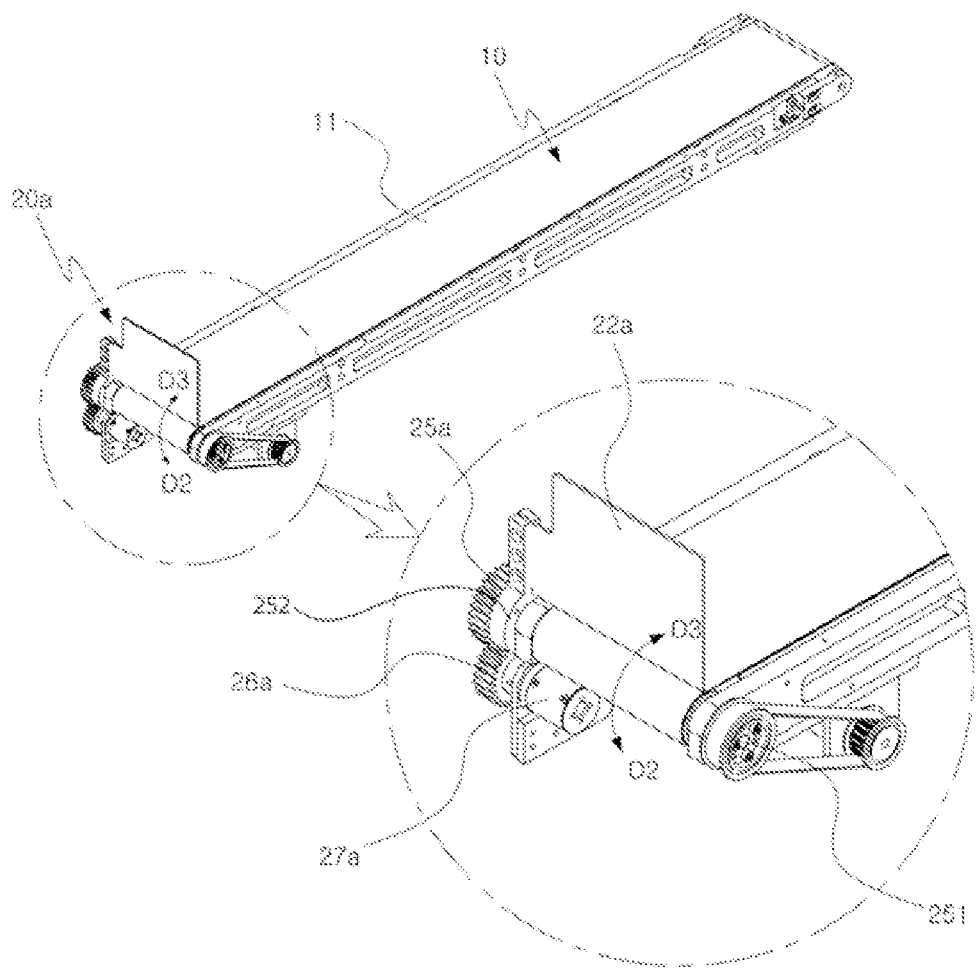
FIG. 14 is a perspective view showing a discharge delaying part according to another embodiment.

A discharge delaying part according to another embodiment will be described with reference to FIG. 14. FIG. 14 is a perspective view showing a discharge delaying part according to another embodiment.

The aforementioned discharge delaying part of FIGS. 7 and 8A has a limitation on a size of the drug that can be discharged through a lower portion of the gate. In other words, an interval between the gate and the main conveyor is the maximum size of the dischargeable drug. The discharge delaying part 20a according to the present embodiment is adapted to enable discharge of larger drugs.

The discharge delaying part 20a according to the present embodiment has a difference in position at which a rotation center of the gate 22a is formed. In other words, in the present embodiment, a hinge 252 may be provided close to a track shaft 251, or be provided on an outer circumference of the track shaft 251 so as to be rotated around the same shaft as shown in FIG. 14. Even in this case, the hinge 252 should be provided to be rotatable independently of the track shaft 251.

In this case, the hinge 252 receives a rotating force generated from a motor 27a through transmission members 26a and 25a such as a gear, and is rotated. The gate 22a is rotated in a direction D3 to be directed upward in connection to the hinge 252, and is thus closed. Otherwise, the gate 22a is rotated in a direction D2 to be directed forward or downward, and is thus opened.

When the gate 22a is opened, the drugs that are placed on the main conveyor belt 11 and are delayed for the discharge by the discharge delaying part 20a can be discharged outside.

While exemplary embodiments of the present invention have been described, the technical scope of the present invention is not limited to these embodiments. The apparatus for collecting dispensed drugs can be realized to have various discharge delaying parts without departing from the spirit or scope of the invention.

What is claimed is:

1. An apparatus for collecting drugs dispensed from drug dispensing boxes, comprising:
a main conveyor on which the dispensed drugs are placed and discharged to a first end thereof;
an auxiliary conveyor configured to be hidden at a lower portion of the first end of the main conveyor or to be expanded outside of the first end so as to increase a discharging path of the dispensed drugs; and
a housing in which the main conveyor and the auxiliary conveyor are disposed,
wherein when the auxiliary conveyor is expanded outside of the first end, at least a part of the auxiliary conveyor is projected from the housing so as to discharge the dispensed drugs to external of the housing.

2. The apparatus of claim 1, wherein the auxiliary conveyor includes an auxiliary conveyor belt rotated along an endless track, and a pair of auxiliary track shafts provided at both ends of the auxiliary conveyor belt to rotate the auxiliary conveyor belt.

3. The apparatus of claim 1, further comprising:
an extension member extending from the auxiliary conveyor to a lower portion of the main conveyor; and
a rail guiding the extension member when the auxiliary conveyor is hidden and expanded.

4. The apparatus of claim 1, further comprising:
a rack gear extending from the auxiliary conveyor to a lower portion of the main conveyor; and
a pinion gear that is provided to correspond to the rack gear and transmits a driving force such that the auxiliary conveyor is hidden or expanded.

5. The apparatus of claim 1, further comprising lateral guards that are formed upward from both sides of the auxiliary conveyor and prevent the dispensed drugs from escaping when the dispensed drugs fall down to the auxiliary conveyor.

6. The apparatus of claim 1, further comprising a first detector detecting whether the auxiliary conveyor is hidden or expanded.

7. The apparatus of claim 6, further comprising a first detection target having at least one first protrusion protruding from the extension member extending from the auxiliary conveyor to the lower portion of the main conveyor,
wherein the first detector includes at least one first sensor detecting the at least one first protrusion when the auxiliary conveyor is hidden or expanded.

8. The apparatus of claim 7, wherein:
the first detector includes a first first sensor and a second first sensor; and
the first detection target includes a first first protrusion detected by one of the first sensor and the second first sensor when the auxiliary conveyor is hidden, and a second first protrusion detected by the other of the first sensor and the second first sensor when the auxiliary conveyor is expanded.

9. The apparatus of claim 1, further comprising a discharge delaying part having a gate that is opened to discharge the dispensed drugs through the first end of the main conveyor or that is closed to delay discharge of the dispensed drugs.

10. The apparatus of claim 9, wherein:
the discharge delaying part includes supports extending upward from both sides of the main conveyor, and at least one first hinge provided for upper ends of the supports; and
the gate extends from the at least one first hinge toward the main conveyor, is rotated around the at least one first hinge, and is opened to discharge the dispensed drugs through the first end of the main conveyor or is closed to delay discharge of the dispensed drugs.

11. The apparatus of claim 10, wherein the gate is opened from the first end of the main conveyor toward an outside of the first end of the main conveyor.

12. The apparatus of claim 10, wherein the at least one first hinge is provided for at least one of both sides of the gate.

13. The apparatus of claim 9, wherein the main conveyor includes a main conveyor belt rotated along an endless track, and a pair of track shafts that are provided for both ends of the main conveyor belt to rotate the main conveyor belt.

14. The apparatus of claim 13, wherein:
the discharge delaying part includes at least one second hinge that is provided to be close and parallel to one of the track shafts; and
the gate extends upward from the at least one second hinge, is rotated around the at least one second hinge, and is opened to discharge the dispensed drugs through the first end of the main conveyor or is closed to delay discharge of the dispensed drugs.

15. The apparatus of claim 14, wherein the at least one second hinge is provided on an outer circumference of the track shaft so as to be rotated independently of the track shaft.

16. The apparatus of claim 9, further comprising a second detector detecting whether the gate is opened or closed.

17. The apparatus of claim 16, further comprising a second detection target that includes at least one second edge having a greater radius from the rotation center thereof than another portion,
   wherein the second detector includes at least one second sensor that is provided to be spaced apart from the rotation center of the second detection target by a predetermined distance and that detects the second edge when the second detection target is rotated.

18. The apparatus of claim 17, wherein:
   the second detector includes a first second sensor and a second sensor that are provided to be separated by a rotation angle of the gate based on the rotation center of the gate; and
   the second detection target includes a first second edge detected by one of the first second sensor and the second sensor when the gate is opened, and a second edge detected by the other of the first second sensor and the second sensor when the gate is closed.

19. The apparatus of claim 9, wherein the gate further includes a brush at a position close to the main conveyor belt so as to minimize a frictional force against the main conveyor belt.

* * * * *